Patented June 14, 1927.

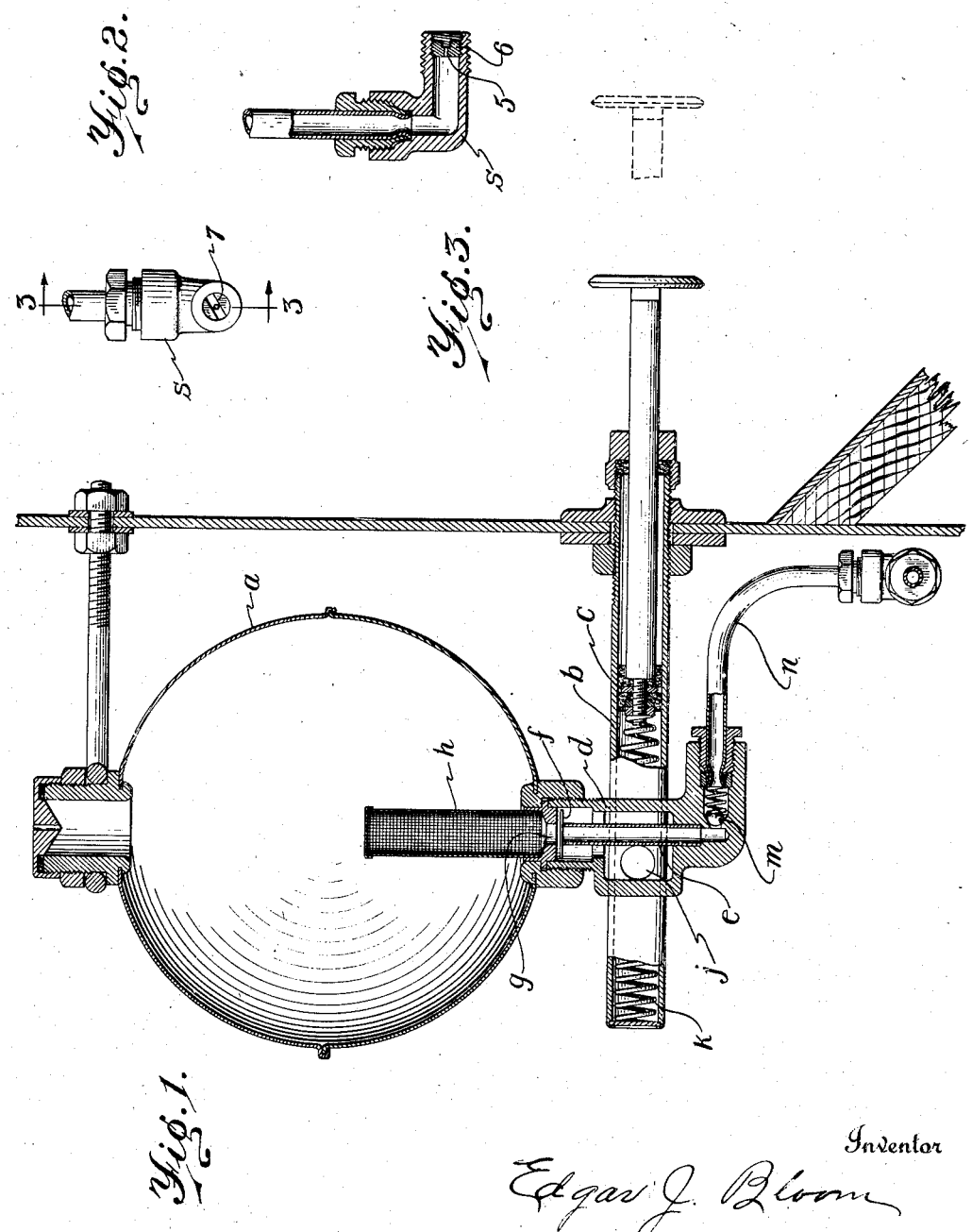

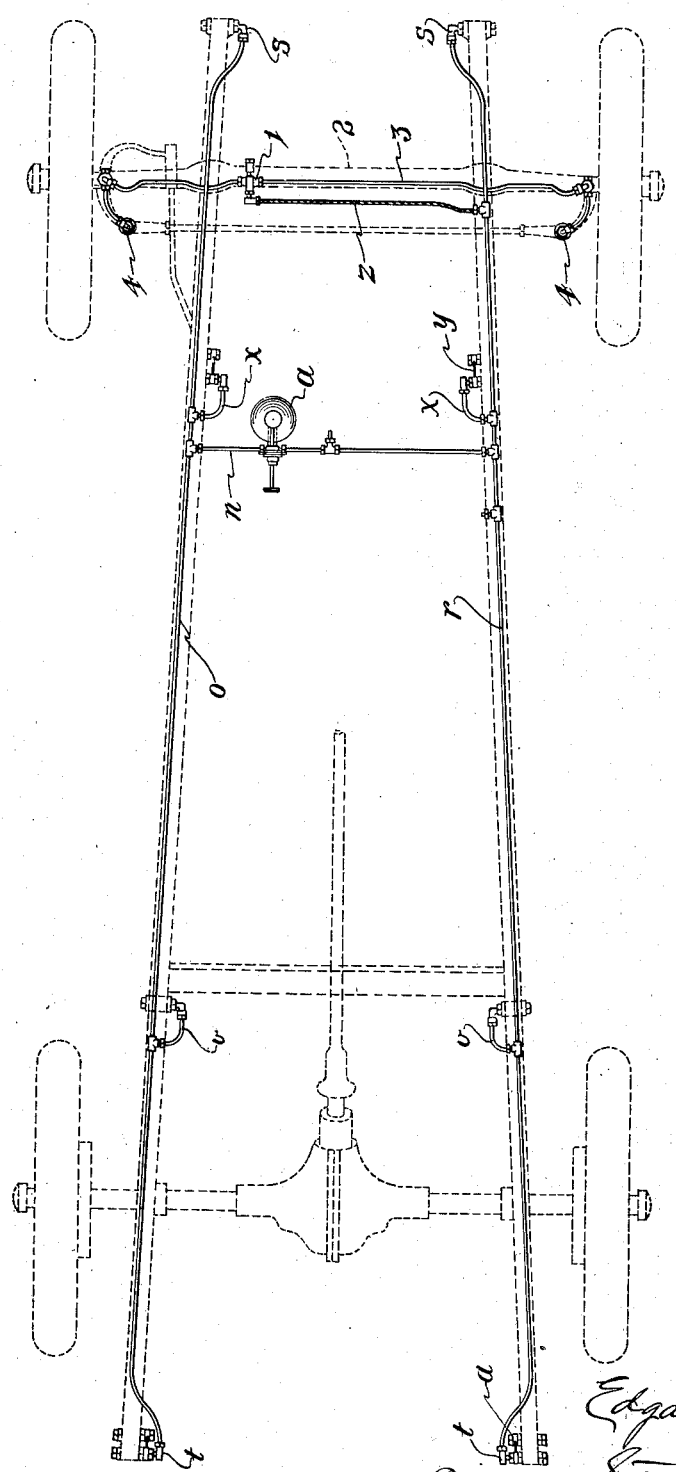

1,632,767

UNITED STATES PATENT OFFICE.

EDGAR J. BLOOM, OF TIFFIN, OHIO, ASSIGNOR, BY MESNE ASSIGNMENTS, TO AUTO RESEARCH CORPORATION, A CORPORATION OF DELAWARE.

CHASSIS LUBRICATION.

Application filed May 19, 1922. Serial No. 562,090.

It is among the objects of the invention to provide a chassis lubricating system of simple construction, easy to instal, in such location as to be unlikely to interfere with access to the pedals and other instruments on the vehicle, but yet readily accessible at the will of the driver for facility of manual or pedal operation.

The invention is more particularly concerned with that type of lubricating system in which a plurality of distributed bearings are concurrently supplied by way of an intervening piping system, with lubricant from a central source, such as a single cylinder force pump.

Another object is to provide a system of the type referred to which will effect a slow and prolonged flow of lubricant to the various bearings in accordance with the requirements of each of said bearings, without the need for a correspondingly prolonged manual operation at the pump.

In the execution of the latter object, the delivery of lubricant after admission thereto the piping system is governed by air exclusion to hold up or minimize the feed of oil. For this purpose, means is provided at the outlet ends or branches of the piping system, which prevents draining the lubricant therefrom, and prevents air from the exterior by-passing in reverse direction the lubricant ahead of it, and means is also provided in the pipe system between the pump and the branches to exclude air both during pump operation and in the intervals between such operations.

Preferably the terminal lengths or branches of the pipe system adjacent the bearings have parts that are restricted to afford an opening too small for entry of air from the bearings past any oil therein, so that some oil will normally remain in said branches although they are not mechanically closed at their outlet ends.

Spring-closed means in advance of the outlet branches and normally submerged in oil from the pump, prevents entry or exit of air from the corresponding ends of the lengths of pipe line intervening between the same and the bearings. The spring-closed means is interrelated with the pump to be maintained open during pump discharge, for passage of lubricant therebeyond and to reclose thereafter. The pump operation results in slow emission from the pipe line to the bearings, which continues until equilibrium in the system has been restored.

In a preferred system, the head of the pipe line is at level materially higher than the bearing outlets, in which relation, the flow would tend to be from the pipe head to the bearings rather than in reverse direction. In this relation, moreover, the spring-closed means which may be associated with the pump and at the elevated head of the line, will also preclude the draining of the pump and reservoir during the intervals between successive pump operations. Preferably the pump is affixed to the dashboard at a point where it is readily accessible for manual or pedal operation from in back of the dash. There being ample room at the forward side of the dashboard for the lubricant reservoir, the latter may be combined thereat in a unitary construction with the pump. The reservoir is, accordingly, readily accessible for refilling and subjected to heat from the engine which may prevent the oil from becoming too viscous in cold weather. Preferably, the reservoir extends directly above the pump to normally drain thereinto past a check valve which is automatically raised and maintained in seated position throughout pump discharge to prevent return of lubricant to the reservoir. The top of the reservoir is vented to facilitate drainage into the pump cylinder therebelow, without, however, venting the pipe line which is normally closed from the reservoir by the oil-sealed spring closed means and during pump operation by the oil flowing through said means, as well as by the closed check valve. By the check valve arrangement, moreover, no vacuum is drawn in the pump cylinder during plunger return, so that a relatively weak return spring may be used, which is easily overcome manually and there is, accordingly, no likelihood of the pump pulling back oil from the pipe line.

In the drawings:

Fig. 1 is an elevation of one form of force pump that may be used.

Fig. 2 is an elevation of one of the fittings or oil cups for the bearings.

Fig. 3 is a section on line 3—3 of Fig. 2.

Fig. 4 is a plan view of the chassis and running gear, showing the oil distribution system.

In the drawings, I have shown a pump and reservoir assembly similar in general construction and operation to that disclosed and claimed per se in my Patent No. 1,451,861, issued on an application copending with the present application and in the reissue of said Patent No. 16,278, granted March 2, 1926.

The assembly includes a horizontal pump cylinder $c$ supported upon the dashboard 12 preferably immediately above the toe board 13. An appropriate flanged construction 11 near the forward end of the pump cylinder secures it to the dashboard, the main length of cylinder extending forward therefrom. The pump cylinder is provided between its ends with a unitary fitting $d$ including an upstanding nipple 14 upon which rests a valve seat button $g$ which supports the bottom of a sheet metal reservoir $a$. The button serves also as a mount for the cylindrical strainer $h$. The assembly is effected by a nut 15 which is swaged about a corresponding aperture in the bottom of the reservoir and is threaded upon the nipple and clamps the valve seat button in position. A stand pipe $e$ is mounted to extend vertically in the fitting and sustains a disk valve $f$ upon its upper end which affords clearance and allows lubricant from the reservoir to drain past the strainer $h$ into the fitting and thence into the pump cylinder.

The pump includes a rod $c'$ protruding rearward from the dash through a cylinder head 16 packed with appropriate gasket material 16'. The rod $c'$ has a piston $c$ composed of cups of appropriate yielding material which are clamped against the end of the rod, and a spring $k$ shown within the cylinder normally urges the piston rod outwardly. The filling plug $p$ of the reservoir is provided with a direct vent $v$ which prevents air lock in the reservoir and facilitates drainage therefrom to the pump cylinder therebelow.

A closure $m$ is provided for a purpose appearing hereinafter, preferably in the form of a valve normally closed or seated by a spring $m'$ located in advance of the outlet ends of the pipe system, preferably near the head of the pipe line.

The head of the main $n$ is secured by an appropriate compression coupling $n'$ to the pump outlet and divides just below the pump as shown in Fig. 4, part of the main reaching the left hand distributing pipe $o$ and part of the main reaching the right hand distributing pipe $r$. These distributing pipes run along the inside of the channel steel sills of the chassis frame and have outlet pipes or branches leading to the bearings. At the front end the mains each connect with a spring bolt cup or fitting $s$. At the extreme rear they each connect with spring bolt cup or fitting $t$ which, in turn, connect with the shackle bolt $u$ by means of a special fixture which is made the subject of a co-pending application No. 562,060. The single spring bolt at the front of each rear spring is taken care of by a branch fitting $v$. The spring and shackle bolt at the rear of the front springs are taken care of by the branch lines $x$ and fixture $y$ as described in detail in my pending application, above referred to.

A flexible tube $z$ leads off from a T in the right hand line $r$ and is connected with a fitting 1 clamped to the axle 2. From this fitting an oil line 3 leads to each knuckle pin. A branch from the knuckle pin cup leads to the oil cups 4 on the steering-arm-connecting-bar ends. A suitable swivel connection can be had between the oil line and the oil cup where relative movement occurs. Such swivel connections are to be found in the prior art.

The division of lubricant is controlled by a corresponding fitting or flow-limiting device, one for each bearing shown in detail in Figs. 2 and 3, and provided with a metered orifice 5. A convenient way to afford these orifices is to provide a screw plug 6, having a screw driver slot 7 by which it may be turned in or out of the threaded cup or fitting. I call these orifices metered because they are carefully calculated or rated in accordance with the needs of the particular bearings on which they are used. They are also of a capillary nature, being very small so as to afford capillary action, which will be described.

In use of the system, the pump handle is pushed inward from time to time, which may be readily effected by a direct manual or pedal action. In this operation, the plunger $c$ exerts pressure on the lubricant in advance thereof, which has previously filled the pump cylinder by flow from the reservoir. The valve $f$ is quickly raised by the pressure on the lubricant at the beginning of the pump stroke, thereby preventing return of lubricant to the reservoir, and the valve $m$ will, accordingly, be displaced from its seat substantially at the beginning of the pump stroke and the pump will discharge into the pipe line system. The outlets being obstructed and thereby restraining the transmission of pressure therethrough from the pump, any air confined in the system between the pump and the obstructed outlets yields to permit the quick ejection by the pump.

After the pump plunger has been pushed to the end of its stroke, it is let go and the spring $k$ returns it to its outermost position, while spring $m'$ recloses valve $m$, after which the bearings are supplied slowly and automatically by an action now to be set forth.

By having small flow limiting passages of the kind set forth, the feed of the oil will be relatively slow, in view of the exclusion of atmospheric air from the feed pipes. As already explained, there is a valve as well as a liquid seal at the pump in advance of the branches and this will exclude atmospheric air from the head of the pipe system. All the fittings are made as near air tight as possible by pipe threads and packing as are also all joints. However, they do not have to be air tight in the sense that if air were introduced into the dry pipes under considerable pressure, there would be no leakage at the joints.

Now, if a small capillary passage is used for an outlet and the amount of the contents behind the outlet is not relatively large so as to provide a large hydrostatic pressure, it will be found that by excluding the atmospheric air from the oil, that none of it will run through the out-let unless it be shaken. The outlet ends or branches being restricted, afford an opening too small for entry of air from the bearings past any oil therein, so that some oil will normally remain in said branches which are, accordingly, substantially oil-sealed.

The valve *f* tends to prevent the oil running out of the elevated supply installation but since the same is closed only by gravity and may, moreover, be jarred up and down while the vehicle is running, the spring-seated closure *m* is relied on to prevent the oil from draining into the main *n* and through one or more of the flow limiting devices. As long as there is any remnant of oil in the reservoir, there is also, as previously indicated, a fluid seal at this point to prevent air admitted for instance through the vent *q* in the reservoir, from reaching down into the main. More particularly, the valve *m* precludes venting the pipe line through the vented reservoir and during pump discharge while valve *m* is open, the closure of check valve *f* in addition to preventing reverse flow of oil to the reservoir affords further safeguard against venting the pipe system through said vented reservoir should the latter be empty.

Air being thus excluded both at the head and the outlet ends of the pipe line and at all intervening parts thereof, the admission of lubricant from the pump into the pipe line will result in slow emission to the bearings, promoted by the vibration of the vehicle when in motion, which emission continues until equilibrium is restored and, in general, until the lubricant remaining in the branches or outlets of the pipe system is sustained by the external atmospheric air.

What I claim is:

1. In a motor vehicle, in combination, chassis bearings, an installation for supplying lubricant to said bearings, said installation including a force pump having a fixed cylinder delivering at a level higher than said bearings, a piping system normally maintained partly filled with oil and supplied from said pump intermittently with small charges of oil and having outlet branches leading to various bearings, a device in each of said branches to limit the flow therethrough, said branches normally oil-sealed to prevent the entry of air in reverse direction therethrough, said piping system being also closed from the external air ahead of said branches, so that the branches will emit oil to the bearings after pump operation, until the state of equilibrium of the pipe contents is restored.

2. In a motor vehicle, in combination, chassis bearings, a force pump, a piping system partly filled with oil supplied from said pump intermittently with small charges of oil and having outlet branches leading to said various bearings, said branches having parts restricted relative to the bore of the rest of the system to an extent such as to prevent the ready exchange of oil and air therethrough, spring-closed valve means normally interrupting communication from the pump to the outlet branches, and opened by pressure transmitted from the pump to pass lubricant thereby, and automatically reseated upon cessation of said pressure, whereby emission of oil will occur from the pipe line to the bearings, after the pump operation, until the state of equilibrium of the pipe contents is restored.

3. A central chassis lubricating installation including an elevated pump, a reservoir connected thereto, a pipe system normally maintained partly filled with oil, having its head connected to said pump and having outlet branches leading to various chassis bearings, said outlet branches having parts of bore so small as to prevent the ready exchange of oil and air therethrough, means between the pump and said branches normally spring-closed to shut off the line thereat, said reservoir being vented to facilitate flow of lubricant therefrom into the pump, said spring-closed means being inter-related with the pump to open automatically during pump discharge and a check valve interposed between the pump and the reservoir automatically shutting off connection between the latter and the pipe line throughout the period that the spring-closed means is open, whereby slow emission of lubricant will take place after each pump operation from the pipe line toward the bearings until the state of equilibrium of the pipe contents is restored.

4. In a motor vehicle, in combination, a dashboard, bearings, a lubricant supply installation including a pump fixed to said dashboard and operable from the rear thereof, a reservoir in front of the dashboard extending above the dashboard end of said pump and assembled therewith, and the top of said reservoir having a vent to facilitate drainage into the pump, a piping system having a main trunk connected to the outlet of said pump and including branches leading from said trunk to said bearings, spring-retained valve means between said pump and said branches, normally seated and oil sealed and shutting off communication to the pipe line therebeyond from the vented reservoir and pump, flow limiting means located in an end of each of said branches to impede the escape of lubricant therefrom, said spring-seated means being inter-related with the pump to open for admission of lubricant from the pump to the pipe line during pump discharge, and a check valve operated at the beginning of pump discharge to shut off the pump and the pipe line head from the vented reservoir throughout the period of pump discharge.

5. In a motor vehicle, in combination, chassis bearings, a dashboard, an installation for supplying lubricant to said bearings, said installation including a pump having a cylinder structure supported near one end thereof from said dash and having an outlet at level higher than said bearings, an inlet carried by said cylinder structure and extending upward therefrom, a lubricant reservoir supported at its bottom upon said inlet, a check valve operated by pump pressure to prevent return flow of lubricant from the pump to the reservoir, a pipe system normally maintained partly filled with lubricant carried upon said chassis and supplied with lubricant from the outlet of said cylinder and having branches leading to various chassis bearings, a device in each of said branches to limit the flow therethrough, said branches normally oil-sealed against the entry of air in reverse direction therethrough, a spring-seated closure member near the pump outlet functioning while the pump is idle to prevent escape of lubricant therefrom into the pipe line, and normally oil sealed, thereby preventing the entry of air to the line thereat, whereby the oil in the branches is slowly emitted to the bearings after pump operation, until the state of equilibrium in the system is restored.

6. In a motor vehicle, in combination, a dash-board, a plurality of chassis bearings, a pump cylinder structure secured near its rear end to the dashboard and extending horizontally forward therefrom at a level above that of said bearings, a plunger rod operable from in back of said dash, an inlet nipple on said structure extending upward therefrom, an outlet socket on said structure extending downward therefrom, a lubricant reservoir carried above said structure and attached to said inlet nipple, a valve within said nipple having a seat and normally affording open communication to admit lubricant from the reservoir into the cylinder structure, said valve subjected to an impulse urging it against said seat while the pump is discharging, thereby to prevent return of lubricant from the pump to the reservoir, a piping system carried by the chassis, connected to said outlet socket and having flow limiting devices spaced from said pump and presenting in operation a minute open passageway of definite area, a single closure for shutting off communication from the pump to all of said flow limiting devices, a spring urging said closure to effective position, said closure inter-related with the pump plunger to be displaced to open position at the beginning of pump discharging stroke and to be held open throughout said stroke.

7. A central chassis lubricating installation including a pipe line having an inlet closed against venting and having branches with outlets feeding the bearings and connected in multiple, means closing said branches against venting, said anti-venting means including fittings normally open to the pipe line from which they are supplied and having orifices therein of dimensions so small as to prevent concurrent flow of lubricant and air therethrough in opposite directions, said orifices adapted to emit lubricant therethrough consequent upon forcing small charges of lubricant into the head of the pipe line, until equilibrium in the system is restored.

8. A central chassis lubricating installation including a pipe line having outlets mounted near the bearings and connected in multiple, a pump connected to the inlet of the piping system, means closing said inlet against venting, means closing said outlets against venting, said latter anti-venting means including fittings at the bearing ends of the branches normally open to the pipe line from which they are supplied and having orifices therein of dimensions so small as to prevent the concurrent flow of lubricant from the branches, and air therethrough in opposite directions, said orifices adapted to emit lubricant therethrough consequent upon forcing of small charges of lubricant from the pump into the head of the pipe line, until equilibrium in the system is restored.

9. A chassis lubricating installation including a source of lubricant pressure, a pipe line supplied therefrom and having a plurality of outlets leading in multiple to the various chassis bearings, a valve interposed between the source of pressure and the pipe line to normally close the otherwise substantially free inlet to the pipe line, and intermittently opened to pass lubricant from said source of pressure into said pipe line, each of said outlets including a fitting applied to the corresponding bearing, having an obstructing rigid plug therein extending longitudinally thereof, each of said plugs determining a minute open passageway, the obstructing effect of which corresponds to the requirements of the associated bearing, said passageways of flow resistance so great as to prevent draining of the pipe line by mere gravity flow.

10. A chassis lubricating system comprising piping having an elevated inlet and including outlets leading to the bearings and restricting the free flow of fluid therethrough in either direction and normally maintaining a quantity of oil in the piping, a supply installation at said inlet including a force pump operable at will to introduce small charges of lubricant into the piping and including an oil-sealed inlet valve closed during the intervals between pump operations, said outlets adapted to emit lubricant therethrough consequent upon forcing small charges of oil into the head of the pipe line until equilibrium in the system is restored.

11. A chassis lubricating system comprising piping having an elevated oil-sealed inlet and a plurality of outlets, a pump operable at will to inject a mass of oil into the inlet of the piping by a direct plunger stroke, said outlets being obstructed and thereby restraining the transmission of pressure therethrough from the pump, and being substantially sealed to prevent the admission of air therethrough to the piping, any air confined in the system between the pump and the obstructed outlets yielding to permit injection by the pump and determining the extent of subsequent emission.

12. A chassis lubricating system including piping having an elevated inlet and a multiplicity of outlets restricting the free flow of fluid therethrough in either direction and maintaining a charge of oil in the piping, a lubricant supply installation at said elevated inlet and including a force pump delivering small charges of oil into the pipe line, a lubricant reservoir in communication with said pump and vented to permit ready flow of lubricant therefrom into said pump, a check valve to prevent return of lubricant to the reservoir during pump discharge, oil-sealed means near the inlet of the piping closing the pipe line from venting through the reservoir, whereby slow emission of lubricant will take place after each pump operation from the pipe line toward the bearings until the state of equilibrium in the system is restored.

13. A chassis oiling installation including distributing pipes along the channel frames of the chassis, a connecting pipe across the chassis frame communicating at its ends with said distributing pipes, means for injecting oil under pressure into an unobstructed inlet of the pipe system, a plurality of branches leading from said distributing pipes and each having an outlet fitting near the corresponding bearing, said fittings including rigid metering plugs determining minute fixed open outlet passages of cross-section so small as to prevent draining by mere gravity flow, said pipe system being closed at its inlet during the intervals between operations, whereby to maintain a quantity of oil in the piping at all times.

14. A chassis oiling installation including distributing pipes longitudinally of the channel frames, a connecting pipe across the chassis frame and intermediate the ends thereof, communicating at its ends with said distributing pipes, a pressure pump for intermittently injecting lubricant into an unobstructed inlet to the pipe system at a point in the neighborhood of said connecting pipe, branches leading from said distributing pipes to various chassis bearings, each of said branches having an outlet fitting applied at the corresponding bearing, said outlet fittings including rigid plugs, determining definite minute open metering outlet passages of cross-section so small as to prevent draining by mere gravity flow, and means closing the inlet end of the pipe system between pump operations, whereby a quantity of oil will at all times remain in the pipe line, and whereby upon operation of the pump a charge equal to that injected thereby into the pipe system will be metered through the outlets.

15. A centralized lubricating installation including distributing piping having a plurality of branches from various parts of the length thereof, means for injecting into the piping, oil from a source of pressure thereat, each of said branches having a lubricator terminal at the outlet end thereof applied at corresponding bearings, said lubricator terminals comprising similar pipe fittings, each of said fittings having a longitudinal bore therein, one end of said fitting being plugged into a corresponding hole in the bearing, the other end being conformed for application thereto of the corresponding branch end in fluid-tight relation with respect thereto and rigid filler members obstructing the respective fittings, each determining a minute invariant open flow obstructing passage, the magnitude of which governs the rating of the fitting, the ratings of said pipe fittings being diverse and being determined each by the rating of the filler member inserted therein.

In testimony whereof I affix my signature.

EDGAR J. BLOOM.